(12) United States Patent
Jang et al.

(10) Patent No.: US 7,688,831 B2
(45) Date of Patent: *Mar. 30, 2010

(54) WIRELESS COMMUNICATION SYSTEM FOR ALLOCATING TRANSMISSION PERIOD

(75) Inventors: Kyung-Hun Jang, Suwon-si (KR); Jong-Ae Park, Yongin-si (KR); Dong-Jun Lee, Seoul (KR); Young-Soo Kim, Seoul (KR); Hyo-Sun Hwang, Seoul (KR)

(73) Assignee: Samsung Electronics Co., Ltd. (KR)

( * ) Notice: Subject to any disclaimer, the term of this patent is extended or adjusted under 35 U.S.C. 154(b) by 394 days.

This patent is subject to a terminal disclaimer.

(21) Appl. No.: 11/581,671

(22) Filed: Oct. 16, 2006

(65) Prior Publication Data

US 2007/0086417 A1 Apr. 19, 2007

Related U.S. Application Data

(60) Provisional application No. 60/727,915, filed on Oct. 18, 2005, provisional application No. 60/730,924, filed on Oct. 27, 2005.

(30) Foreign Application Priority Data

Jun. 8, 2006 (KR) ...................... 10-2006-0051604

(51) Int. Cl.
*H04L 12/28* (2006.01)
(52) U.S. Cl. .................... 370/395.4; 455/574; 455/522; 370/311; 370/328; 370/329; 370/338; 370/318
(58) Field of Classification Search ................. 370/389, 370/338, 347, 329, 311, 318, 341; 455/522, 455/69, 450–454, 509–517
See application file for complete search history.

(56) References Cited

U.S. PATENT DOCUMENTS 6,141,336 A 10/2000 Bauchot et al.

(Continued)

FOREIGN PATENT DOCUMENTS

WO WO 2005/039105 4/2005

(Continued)

OTHER PUBLICATIONS

Seongkwan Kim et al., A High-Throughput MAC Strategy for Next-Generation WLANs, Proceedings of the Sixth IEEE International Symposium on a World of Wireless Mobile and Multimedia Networks, 2005.

(Continued)

*Primary Examiner*—Rafael Pérez-Gutiérrez
*Assistant Examiner*—Issam Chakour
(74) *Attorney, Agent, or Firm*—NSIP Law

(57) ABSTRACT

A system is provided for efficiently allocating a transmission period in a WLAN system. An access point (AP) transmits a PSMP message providing a downlink period and an uplink period provided to each station (STA), and at least one sub PSMP frame indicating a period of at least one of a downlink and an uplink for an STA requiring additional resource allocation. After exchanging data with the AP in the downlink and uplink periods provided by the PSMP frame, if there is a need for additional resource allocation, the STA receives the at least one sub PSMP frame and exchanges data with the AP in the period provided by the each sub PSMP frame.

6 Claims, 5 Drawing Sheets

U.S. PATENT DOCUMENTS

| | | | |
|---|---|---|---|
| 6,973,052 B2 * | 12/2005 | Wang et al. | 370/278 |
| 7,245,634 B2 * | 7/2007 | Yen | 370/468 |
| 2001/0038620 A1 * | 11/2001 | Stanwood et al. | 370/336 |
| 2003/0048765 A1 * | 3/2003 | Jang | 370/337 |
| 2004/0044784 A1 | 3/2004 | Hirano | |
| 2005/0018624 A1 * | 1/2005 | Meier et al. | 370/318 |
| 2005/0135302 A1 * | 6/2005 | Wang et al. | 370/329 |
| 2006/0046643 A1 * | 3/2006 | Izumikawa et al. | 455/7 |
| 2006/0165036 A1 * | 7/2006 | Chandra et al. | 370/329 |
| 2006/0285517 A1 * | 12/2006 | Kakani | 370/329 |
| 2007/0115905 A1 * | 5/2007 | Jokela et al. | 370/338 |

FOREIGN PATENT DOCUMENTS

WO    WO 2006/134472    12/2006

OTHER PUBLICATIONS

U.S. Appl. No. 11/582,005, filed Oct. 2006, Jang et al.
U.S. Appl. No. 11/582,495, filed Oct. 2006, Jang et al.
U.S. Appl. No. 11/581,941, filed Oct. 2006, Jang et al.
U.S. Appl. No. 11/581,283, filed Oct. 2006, Jang et al.
U.S. Appl. No. 11/581,279, filed Oct. 2006, Jang et al.
U.S. Appl. No. 11/582,757, filed Oct. 2006, Jang et al.
U.S. Appl. No. 11/582,171, filed Oct. 2006, Jang et al.
U.S. Appl. No. 11/582,723, filed Oct. 2006, Jang et al.
U.S. Appl. No. 11/582,918, filed Oct. 2006, Jang et al.
U.S. Appl. No. 11/581,913, filed Oct. 2006, Jang et al.
U.S. Appl. No. 11/582,692, filed Oct. 2006, Jang et al.
U.S. Appl. No. 11/582,169, filed Oct. 2006, Jang et al.
U.S. Appl. No. 11/582,759, filed Oct. 2006, Jang et al.
U.S. Appl. No. 11/581,496, filed Oct. 2006, Jang et al.

* cited by examiner

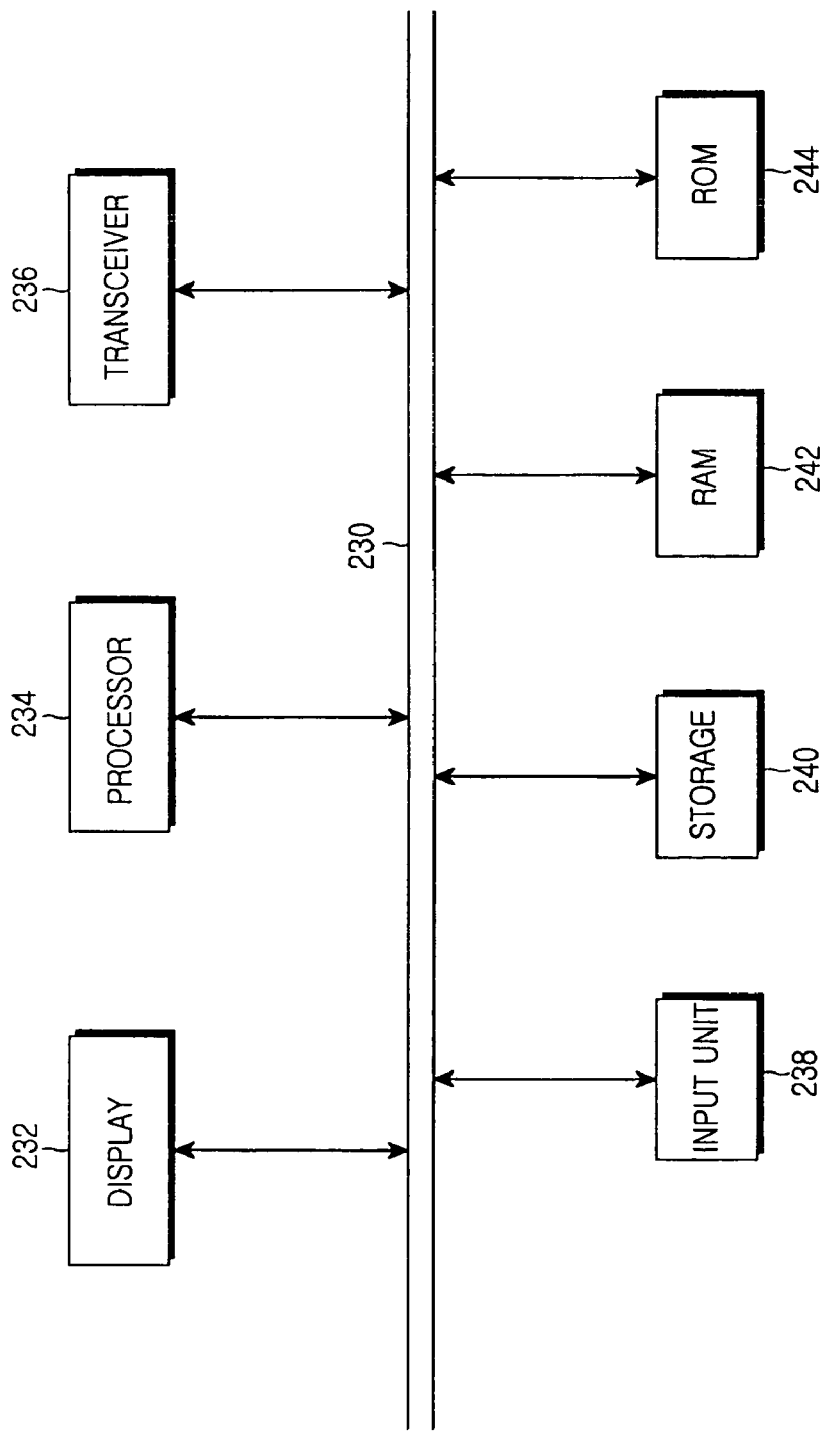

WIRELESS COMMUNICATION SYSTEM FOR ALLOCATING TRANSMISSION PERIOD

PRIORITY

This application claims the benefit under 35 U.S.C. §119 (a) of an application entitled "Phase Resource Allocation Method" filed in the United States Patent and Trademark Office on Oct. 18, 2005 and assigned Ser. No. 60/727,915, an application entitled "Multi-Phase Resource Allocation Method" filed in the United States Patent and Trademark Office on Oct. 27, 2005 and assigned Ser. No. 60/730,924, and application entitled "Method and Apparatus for Allocating Transmission Period in a Wireless Communication System, and System Therefor" filed in the Korea Intellectual Property Office on Jun. 8, 2006 and assigned Serial No. 2006-51604, the entire contents of all of which are incorporated herein by reference.

BACKGROUND OF THE INVENTION

1. Field of the Invention

The present invention relates generally to a wireless communication system, and in particular, to a system for efficiently allocating a transmission period in a transmission frame period of a wireless network system.

2. Description of the Related Art

Along with the recent development of wireless communication technologies and the resulting spread of wireless equipment, there is an increasing demand for high-speed, highly-reliable data transmission via a wireless link. A Wireless Local Area Network (WLAN) developed to meet the demand is basically composed of stations (STAs), which are mobile data communication equipment, and an access point (AP) capable of exchanging data with the STAs. The AP and the STAs, located in the same wireless service coverage area, are known as a Base Service Set (BSS).

In a WLAN system, STAs located in one wireless service coverage area transmit or receive data using wireless resources allocated from an AP. In this case, the AP allocates the wireless resources in the form of phase resources, and the term "phase resources" refers to a period in which the STAs or AP can transmit data.

FIG. 1 illustrates a structure of a transmission frame period in a conventional WLAN system.

Referring to FIG. 1, in a transmission frame period 100 having a fixed length determined in the system, an AP transmits a MAP (mapping) frame 110 indicating phase resource allocation for the full transmission frame period 100. The MAP frame 110 is composed of a downlink MAP 120 indicating a period in which the AP can transmit data, and an uplink MAP 122 indicating a period in which the STAs can transmit data. The downlink MAP 120 is composed of a Number-of-STAs field 130, and at least one STA Information field 132 determined based on the Number-of-STAs field 130. Similarly, the uplink MAP 122 is composed of a Number-of-STAs field 134, and at least one STA Information field 136 determined depending on the Number-of-STAs field 134. The STA Information fields 132 and 136 each include STA ID fields 140 and 144 indicating downlink or uplink periods allocated to the STAs, and Time Offset fields 142 and 146 indicating time offsets allocated to the STAs.

An STA, that has been allocated a period in the MAP frame 110, receives data in a period indicated by corresponding STA information, of a downlink period 112, and transmits data in a period indicated by corresponding STA information, of an uplink period 114. The STA holds a sleep mode in the other period except for the period in which the MAP frame 110 is transmitted and the period indicated by the MAP frame 110. A contention period 116 following the uplink period 114 can be accessed by at least one STA on a contention basis.

In this way, the AP estimates the amount of resources required for each STA in one transmission frame period 100, and allocates downlink and uplink periods according to the estimation. However, when the AP overestimates the amount of resources required for the STA, the wireless resources are wasted, decreasing data throughput performance. In this case, the STA may not use the allocated wireless resources. Moreover that resource can not be reused by other STAs since that resource is already allocated to the particular STA. When the AP underestimates the amount of resources required for the STA, the STA cannot be allocated its required resources until at least the next transmission frame period, suffering transmission delay and jitter of the uplink service. The transmission delay and jitter affects a Quality of Service (QoS) required by the STA. In addition, if the STA accesses the contention period 116 due to a lack of its allocated resources, the STA cannot operate in the sleep mode for the contention period, wasting its power.

Therefore, in the wireless communication system in which the AP determines the downlink and uplink periods required for the STA through scheduling, there is a need for technology for preventing the reduction in data throughput and the waste of STA power, and efficiently allocating downlink and uplink periods.

SUMMARY OF THE INVENTION

To substantially solve at least the above problems and/or disadvantages and to provide at least the advantages below, the present invention provides a transmission period allocation system for minimizing a waste of STA power without reducing data throughput in a wireless communication system.

The present invention provides a system for flexibly allocating a transmission period required for an STA using more than two MAP frames in a wireless communication system.

According to one aspect of the present invention, there is provided a wireless network system including an access point (AP) for transmitting a PSMP frame providing a downlink period and an uplink period allocated to at least one station (STA), and at least one sub-PSMP frame providing at least one of an additional downlink period and an additional uplink period to at least one STA requiring additional resource allocation, the additional downlink period being provided in the frame period if there is additional data to be received by the STA and the additional uplink period being provided in the frame period if there is additional data to be transmitted by the STA; and an STA for receiving from the AP the PSMP frame and the sub-PSMP frame, receiving data from the AP in the downlink period provided by the PSMP frame and transmitting data to the AP in the uplink period provided by the PSMP frame, and receiving data in the additional downlink period provided by the sub-PSMP frame if there is additional data to be received, and transmitting data in the additional uplink period provided by the sub-PSMP frame if there is additional data to be transmitted.

BRIEF DESCRIPTION OF THE DRAWINGS

The above and other objects, features and advantages of the present invention will become more apparent from the following detailed description when taken in conjunction with the accompanying drawings in which:

FIG. 2B is a block diagram illustrating an exemplary structure of an AP and each STA in the WLAN system shown in FIG. 2A;

DETAILED DESCRIPTION OF PREFERRED EMBODIMENTS

Preferred embodiments of the present invention will now be described in detail with reference to the annexed drawings. In the following description, a detailed description of known functions and configurations incorporated herein has been omitted for clarity and conciseness.

A main feature of the present invention, which is related to allocation of transmission periods in a wireless communication system, is to provide more than one MAP (mapping) frames to indicate a period allocated by an access point (AP) to each station (STA) in a transmission frame period.

The allocated period starts immediately after the MAP frame is transmitted, and in the transmission frame period, the MAP frames other than the first MAP frame will be referred to as "subsequent MAPs (sub MAPs)."

Although a detailed description of the present invention will be made with reference to a Wireless Local Area Network (WLAN) system based on IEEE 802.11 standards, it will be understood by those skilled in the art that allocation of phase resources, a basic object of the present invention, can also be applied to other wireless communication systems having similar technical requirements and channel formats without departing from the spirit and scope of the invention.

Figure 1:
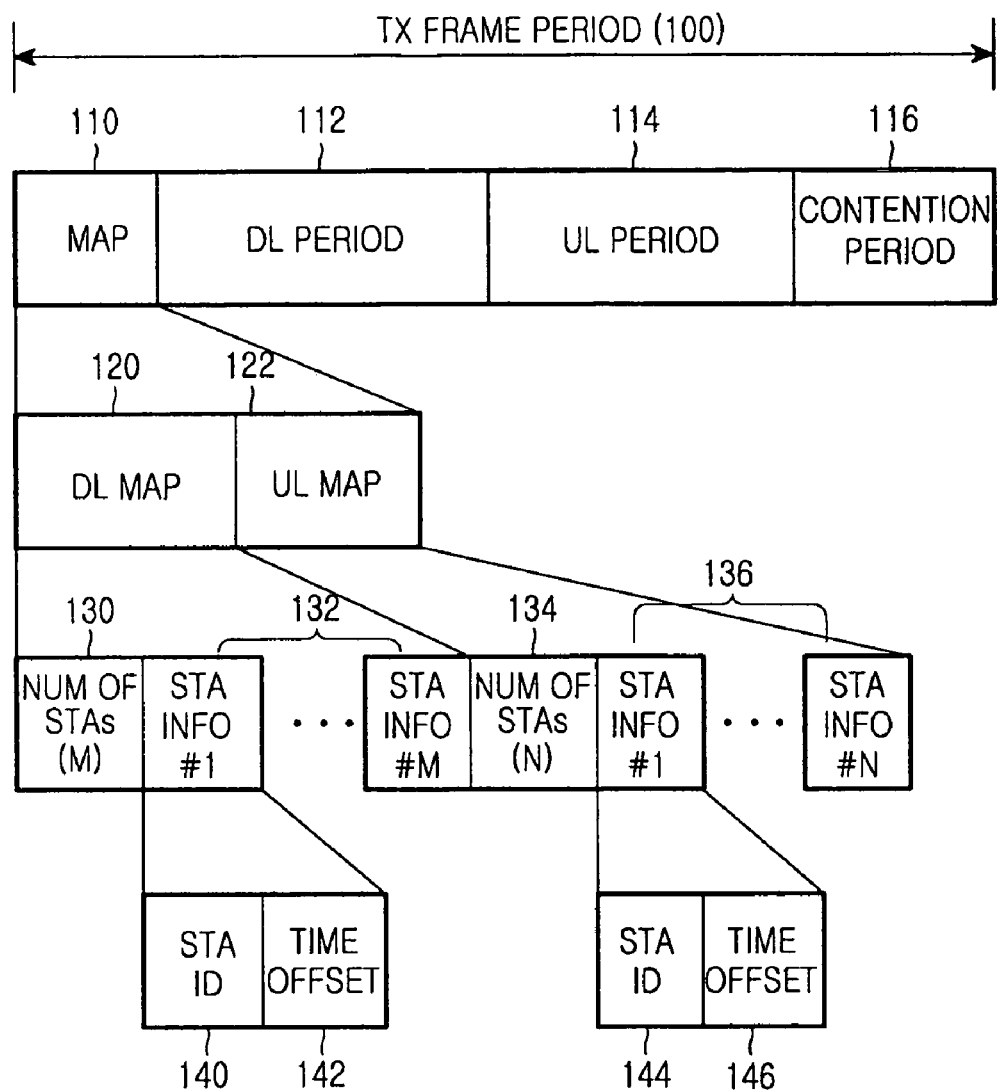
FIG. 1 is a diagram illustrating a structure of a transmission frame period in a conventional WLAN system.
Figure 2A:
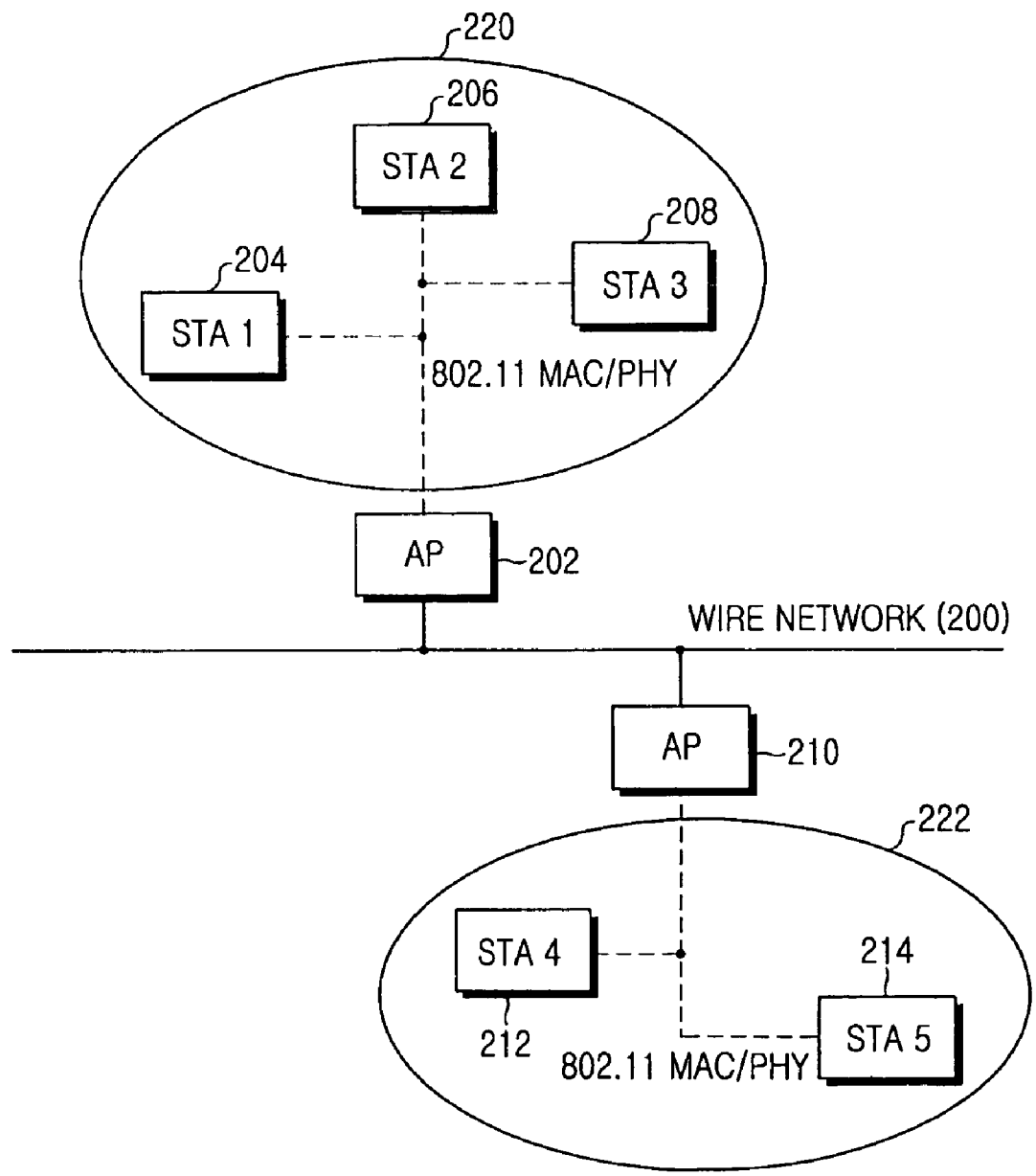
FIG. 2A is a diagram illustrating a configuration of a WLAN system according to the present invention.

FIG. 2A illustrates a configuration of a WLAN system according to the present invention.

Referring to FIG. 2A, each of APs 202 and 210 is connected to a wire network 200, and a plurality of STAs 204, 206, 208, 212 and 214 access their associated APs 202 and 210 via an IEEE 802.11 Physical (PHY) layer and a wireless link based on a Media Access Control (MAC) protocol, and transmit/receive data over a plurality of wireless channels. The STAs 204 to 208 and the AP 202, located in the same wireless service coverage area 220, constitute one Base Service Set (BSS). In the same way, the STAs 212 and 214 and the AP 210, located in the wireless service coverage area 222, form another BSS. STAs located in each BSS can exchange data with each other via a corresponding AP. The key functions of the APs 202 and 210 include delivery of data traffic, access to another network (e.g. wire network 200), roaming support, synchronization in a BSS, power management support, and control of media access for supporting time-bound service in a BSS.

FIG. 2B is a block diagram illustrating an exemplary structure of an AP and each STA in the WLAN system shown in FIG. 2A. Both of the AP and the STA can include a display 232, a processor 234, a transceiver 236, an input unit 238, a storage 240, a Random Access Memory (RAM) 242, a Read Only Memory (ROM) 244, and a common bus 230. The illustrated exemplary structure is merely provided for convenience. Although specific elements and their operations of a computer system serving as an AP or an STA will be described herein with reference to FIG. 2B, the exemplary description should not limit the present invention.

Referring to FIG. 2B, the transceiver 236, connected to an antenna (not shown), receives desired data and converts the received signal into corresponding digital data. The processor 234 is a controller operating under the control of an operating system (OS) and other programs, included in the ROM 244, and the data and information generated by an operation of the processor 234 are stored in the RAM 242.

The key operations of the processor 234 included in the AP include generation/analysis of data, allocation of periods for the STAs located in the same wireless service coverage area and connected to the AP, generation of at least one MAP frame indicating the allocated period, and operation mode control for the transceiver 236 based on the allocated period. Specifically, the processor 234 of the AP allocates initial resources $R_{init}$ to the STAs through a MAP frame located in the first part of a transmission frame, and if there is a need for additional resource allocation, the processor 234 additionally allocates, for uplink/downlink transmission, the remaining period in the transmission frame period to at least one STA requiring the additional resource allocation, through the sub MAP frame transmitted immediately after a sequence duration associated with the first MAP frame of the transmission frame. It would be obvious to those skilled in the art that the term "immediately after" substantially refers to a lapse of a predetermined time.

After the expiration of the downlink/uplink period indicated by the first MAP frame, if necessary, more than one sub MAP frames indicating the downlink and/or uplink periods allocated in the same transmission frame period can be additionally transmitted. The sub MAP frame is followed by the downlink and/or uplink periods indicated by the sub MAP frame.

The key operations of the processor 234 included in the STA include generation/analysis of data, generation of a transmission frame, and operation mode control for the transceiver 236 based on a MAP frame received from the start point of the transmission frame. That is, the processor 234 controls the transceiver 236 such that it receives the MAP frame from the AP at the start point of every transmission frame, and analyzes the MAP frame to determine whether its own STA ID (identification) is included therein. If its own STA ID is included in the MAP frame, the processor 234 stores in the storage 240 information related to the allocated downlink and uplink periods indicated by the STA information associated with the STA ID, and then wakes up both a receiver and a transmitter of the transceiver 236 in the downlink and uplink periods so as to receive/transmit the data. The receiver and the transmitter of the transceiver 236 enter the sleep mode in the other periods except for the allocated periods. Further, the processor 234 of the STA monitors whether a sub MAP frame indicating additionally allocated resources is received from the AP after the expiration of the full period indicated by the MAP frame, and upon receipt of the sub MAP frame, analyzes the received sub MAP frame.

Figure 3:
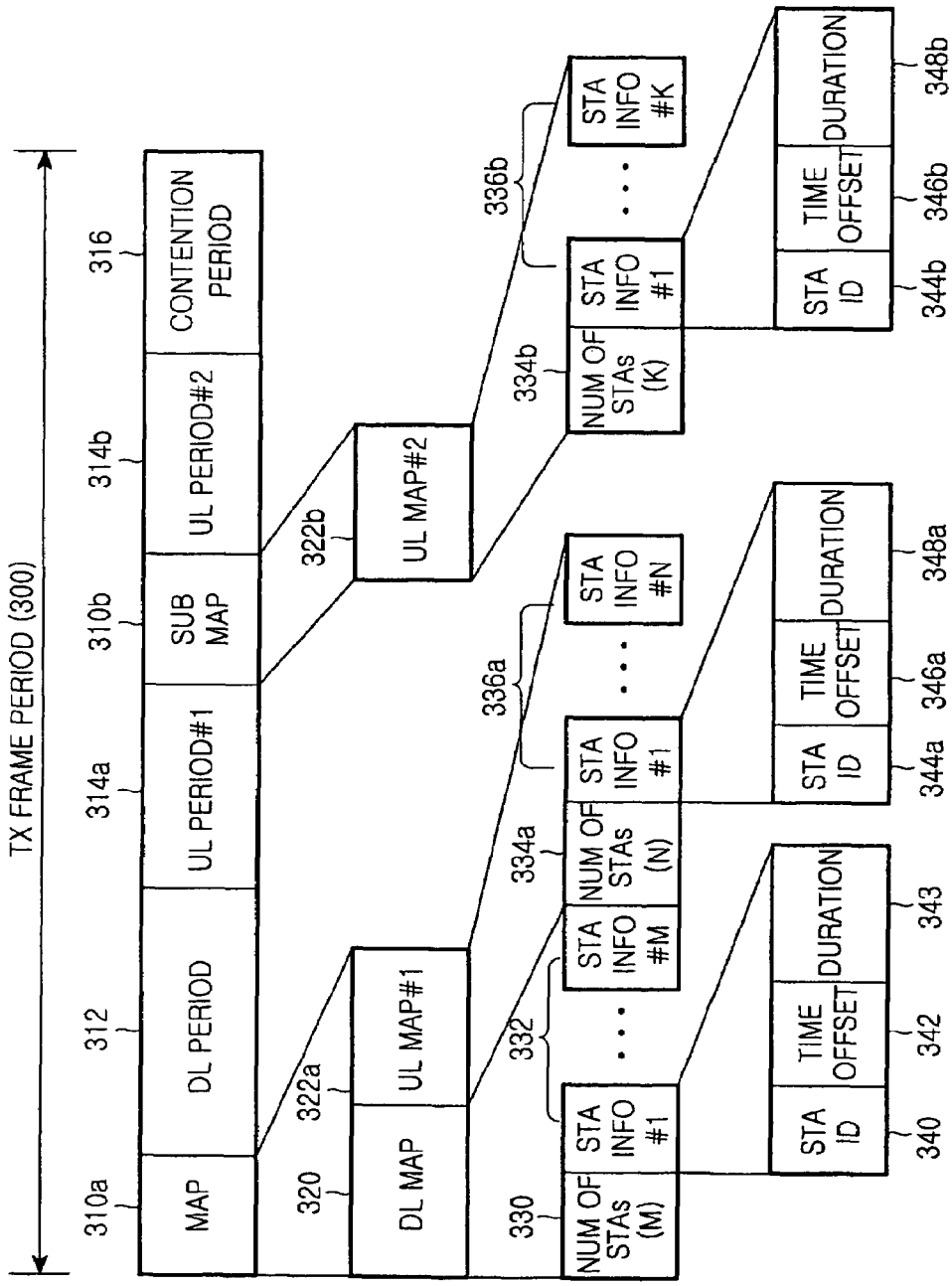
FIG. 3 is a diagram illustrating a structure of a transmission frame period according to the present invention.

FIG. 3 illustrates a structure of a transmission frame period according to the present invention. Although it is illustrated herein that frames and uplink/downlink periods are adjacent, intervals for transmission/reception switching and processing may exist in the actual system.

Referring to FIG. 3, in a transmission frame period 300 having a fixed length, an AP first transmits a MAP frame 310a with a basic rate set (including modulation scheme, coding rate, and data rate), which is less than a normal rate set. This is to enable all STAs in the service coverage area to receive the MAP frame 310a. Initially, the MAP frame 310a is periodically transmitted according to a fixed period (for example, about 20 ms and 100 ms for Voice over Internet Protocol (VoIP) and Moving Picture Experts Group 4 (MPEG4), respectively) determined through a negotiation between the AP and the STA. The transmission frame period 300 is initialized by the transmission of the MAP frame 310a.

For example, the MAP frame 310a, in order to indicate phase resource allocation of its succeeding downlink period 312 and first uplink period 314a, is composed of a downlink MAP 320 indicating a period in which the AP can transmit data in the downlink period 312, and a first uplink MAP 322a indicating a period in which the STA can transmit data in the first uplink period 314a. The downlink MAP 320 is composed of a Number-of-STAs field 330 and at least one STA Information field 332 determined based on the Number-of-STAs field 330. In the same way, the first uplink MAP 322a is composed of a Number-of-STAs field 334a and at least one STA Information field 336a determined based on the Number-of-STAs field 334a.

The STA Information fields 332 and 336a each include STA ID fields 340 and 344a that indicate STAs that have been allocated the periods in the downlink period 312 and the first uplink period 314a, Time Offset fields 342 and 346a that indicate start times of the periods allocated to the STAs, and Duration fields 343 and 348a that indicate the lengths of the allocated periods. The STA ID fields 340 and 344a each include at least a part of an Association Identity (AID) of each STA, or at least a part of a hardware address, i.e. a MAC address, given to each STA. An STA ID that indicates a period for broadcast/multicast data is set to a particular value, for example, '0'. The Time Offset fields 342 and 346a each indicate an interval from the MAP frame 310a to a start time of a corresponding period as a multiple of a predetermined unit of time (for example, 4 µs). The Duration fields 343 and 348a each indicate an interval from a start time to an end time of the period, i.e. indicate a length of the period, as a multiple of a predetermined unit of time (for example, 16 µs).

The first uplink MAP 322a of the MAP frame 310a indicates an uplink period first allocated for the STA, and can be determined according to a required data rate for individual service joined by each STA, or the amount of data estimated by the AP. The STA, allocated a period by the MAP frame 310a, receives data in the period indicated by the corresponding STA information 332, in the downlink period 312, and transmits data in the period indicated by the corresponding STA information 336a, in the first uplink period 314a. The downlink and uplink data can include MPDUs including one or more Aggregate MAC Protocol Data Unit (PDU) (A-MPDU) and/or payload, and an Acknowledgement. The STA maintains the sleep mode in the period where the MAP frame 310a is transmitted, and the other periods except for the periods indicated by the MAP frame 310a.

After transmitting the data in the allocated period of the first uplink period 314a, each STA determines whether there is a need for additional resource allocation. The need for additional resource allocation is determined based on whether there is additional transmission data, or whether there is information to receive from the AP. A detailed description thereof will be omitted in order not to obscure the clear understanding of the present invention. An STA requiring additional resource allocation, monitors a sub MAP frame 310b after expiration of the first uplink period 314a. The sub MAP frame 310b can indicate the downlink and/or uplink resources additionally allocated by the AP, and it is shown in FIG. 3 that the sub MAP frame 310b indicates allocation of additional uplink resources, by way of example.

That is, the sub MAP frame 310b includes a second uplink MAP 322b indicating phase resource allocation for its succeeding second uplink period 314b. Similarly, the sub MAP frame 310b can be transmitted with the basic rate set. The second uplink MAP 322b is composed of a Number-of-STAs field 334b and at least one STA Information field 336b determined based on the Number-of-STAs field 334b. The STA Information field 336b includes an STA ID field 344b that indicates an STA allocated a period in the second uplink period 314b, a Time Offset field 346b that indicates a start time of the period allocated to the STA, and a Duration field 348b that indicates a length of the period. The elements of the STA Information field 336b have been described above. An STA, allocated phase resources by the sub MAP frame 310b, receives data in the period indicated by the corresponding STA information 336b, of the second uplink period 314b.

Although not illustrated, if there is another need for additional resource allocation, more than one sub MAP frames and an uplink period or a downlink period based on the sub MAP frames can be additionally included in the transmission frame period 300. A transmission scheme using a MAP frame capable of accompanying one or more sub frames is referred to as a Multi-Phase "Power Save Multi-Poll (PSMP)," and the MAP frame 310a and the sub MAP frame 310b are referred to as a PSMP frame and a sub PSMP frame, respectively. Each of the PSMP frame and the sub PSMP frame is followed by at least one downlink or uplink period indicated by the corresponding (sub) PSMP frame, and one (sub) PSMP frame and a corresponding period are referred to as a (sub) PSMP sequence. In other words, one PSMP sequence is initialized by transmitting the PSMP frame, and the STA wakes up only in the period indicated by the PSMP frame in the PSMP sequence starting with the PSMP frame, thereby minimizing power consumption.

A contention period 316 following the last sequence duration can be accessed by at least one STA on a contention basis.

It should be noted that elements of the MAP frames 310a and 310b shown in FIG. 3 and their arrangements are subject to change without departing from the spirit and scope of the invention. For example, each of the MAP frames 310a and 310b includes one STA ID field, Time Offset and Duration fields for downlink transmission, and Time Offset and Duration fields for uplink transmission. In this case, if no period is allocated to the uplink or downlink, a corresponding Duration field is set to Null (0). In addition, each of the MAP frames 310a and 310b can include a field for indicating whether it will be followed by another sub MAP frame. The STA analyzes the field in the sub MAP frame to determine whether the sub MAP frame is the last sub MAP frame in the current transmission frame period.

Figure 4:
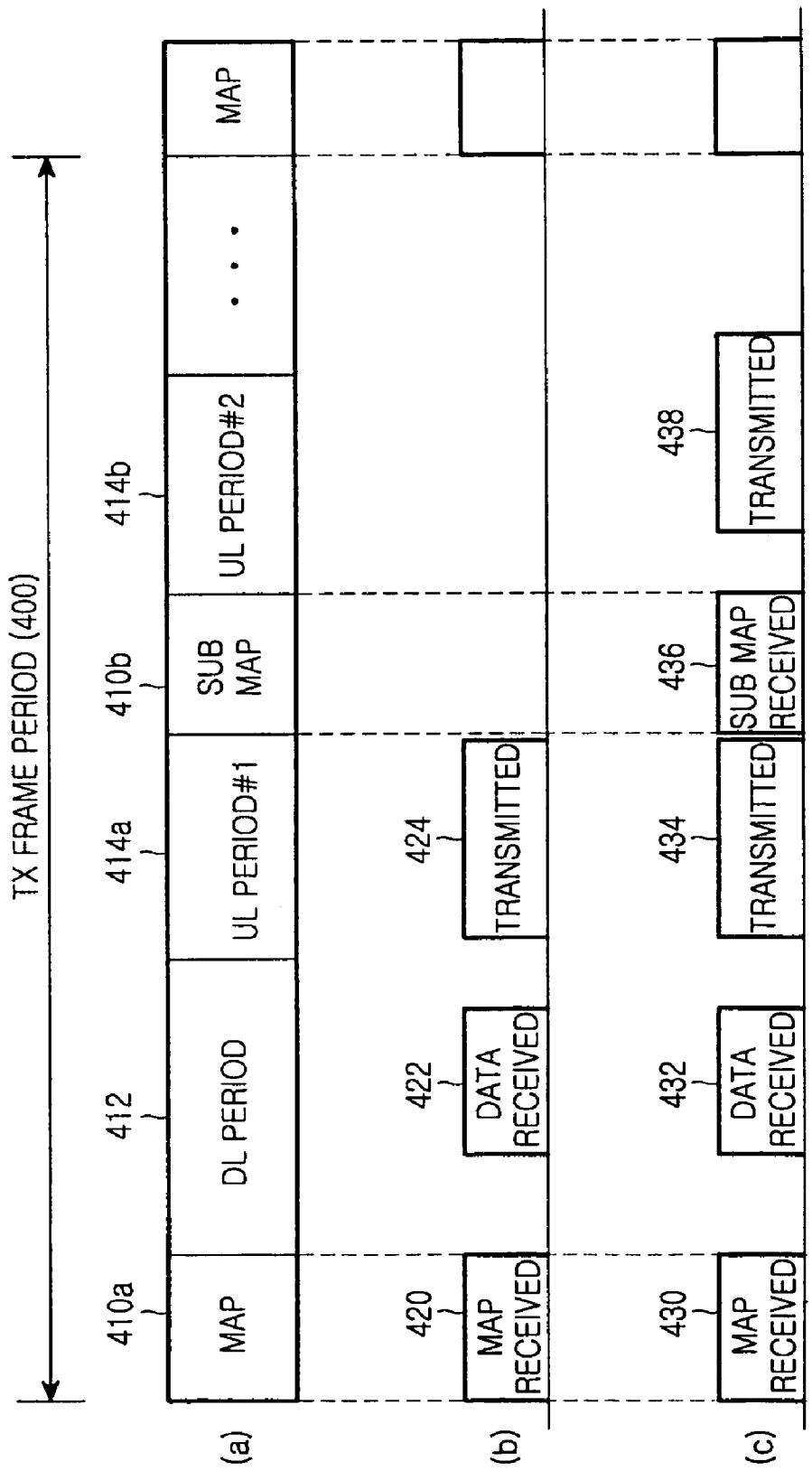
FIG. 4 is a timing diagram illustrating a power reduction effect of the phase resource allocation according to the present invention.

FIG. 4 is a timing diagram illustrating a power reduction effect of the phase resource allocation according to the present invention.

Referring to diagram (a) of FIG. 4, a transmission frame period 400 includes a MAP frame 410a, a downlink period 412, a first uplink period 414a, a sub MAP frame 410b, and a second uplink period. The MAP frame 410a indicates phase resource allocation of the downlink period 412 and the first uplink period 414a.

Diagram (b) of FIG. 4 shows a scenario in which the resources of the first uplink period 414a allocated by the MAP frame 410a are enough to transmit data and control messages desired by the STA. That is, after switching to the sleep mode after receipt of the MAP frame 410a in a period 420, the STA wakes up in an allocated period 422 in the downlink period 412 indicated by the MAP frame 410a and receives data from the AP. After switching back to the sleep mode upon expiration of the period 422, the STA maintains the sleep mode until an allocated period 424 in the first uplink period 414a indicated by the MAP frame 410a. In the period 424, the STA transmits data and/or control messages to the AP. Here, the STA, as it has no need for additional resource allocation, holds the sleep mode until it receives a MAP frame of the next transmission frame period, without monitoring receipt of the sub MAP frame 410b.

Diagram (c) of FIG. 4 shows a scenario in which after expiration of the first uplink period 414a allocated by the MAP frame 410a, there is a need for additional resource allocation for the STA. That is, after switching to the sleep mode after receipt of the MAP frame 410a in a period 430, the STA wakes up in an allocated period 432 in the downlink period 412 indicated by the MAP frame 410a, and receives data from the AP. After switching back to the sleep mode upon expiration of the period 432, the STA maintains the sleep mode until an allocated period 434 in the first uplink period 414a indicated by the MAP frame 410a. In the period 434, the STA transmits data to the AP. Here, the STA, as it requires additional resource allocation, wakes up again in a period 436 and monitors receipt of the sub MAP frame 410b. Upon receipt of the sub MAP frame 410, the STA switches back to the sleep mode and waits until period 438 in a second uplink period 414b indicated by the sub MAP frame 410b. In the period 438, the STA transmits data to the AP. Although not illustrated, there is a possible allocated period mapped to additional one or more MAP frames before expiration of the transmission frame period 400.

As can be understood from the foregoing description, even though the amount of resources estimated by the AP is not accurate, the present invention minimizes a waste of resources and a reduction in the data throughput, and maximizes the time in which the STA maintains the sleep mode without unnecessarily monitoring the downlink or uplink, reducing power consumption of the STA. In addition, the present invention can perform additional resource allocation required for the STA in the current frame period, without reserving the additional resource allocation until the next transmission frame period.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A wireless network system, comprising:
    an access point (AP) to transmit a power save multi-poll (PSMP) frame allocating a downlink period and an uplink period in a frame period, and to transmit a subsequent PSMP frame allocating at least one of an additional downlink period and an additional uplink period in the frame period to provide an additional resource allocation; and
    a station (STA) to receive from the AP the PSMP frame and the subsequent PSMP frame, to receive data from the AP during the downlink period and transmit data to the AP during the uplink period, and to receive data from the AP during the additional downlink period in response to there being additional data to be received and transmit data to the AP during the additional uplink period in response to there being additional data to be transmitted.

2. The wireless network system of claim 1, wherein the PSMP frame comprises:
    an identifier (ID) of the STA;
    a start offset indicating a start point of the downlink and uplink periods provided by the PSMP frame; and
    a duration field indicating a length of the downlink and uplink periods provided by the PSMP frame.

3. The wireless network system of claim 1, wherein the uplink period provided by the PSMP frame is allocated according to a required data rate.

4. The wireless network system of claim 1, wherein the subsequent PSMP frame comprises:
    an identifier (ID) of the STA;
    a start offset indicating a start point of each period provided by the subsequent PSMP frame; and
    a duration field indicating a length of each period provided by the subsequent PSMP frame.

5. The wireless network system of claim 1, wherein the downlink and uplink periods provided by the PSMP frame and the at least one of the additional downlink period and the additional uplink period provided by the subsequent PSMP frame are included in one transmission frame period having a fixed length.

6. A wireless network system, comprising:
    an access point (AP) to transmit a power save multi-poll (PSMP) frame allocating a downlink period and an uplink period in a frame period, and to transmit a subsequent PSMP frame allocating at least one of an additional downlink period and an additional uplink period in the frame period to provide an additional resource allocation, wherein the subsequent PSMP frame is an additional PSMP frame to follow the PSMP frame in the frame period having a periodic duration; and
    a station (STA) to receive from the AP the PSMP frame and the subsequent PSMP frame, to receive data from the AP during the downlink period and transmit data to the AP during the uplink period, and to receive data from the AP during the additional downlink period in response to there being additional data to be received and transmit data to the AP during the additional uplink period in response to there being additional data to be transmitted.

* * * * *